United States Patent [19]

Hughes et al.

[11] Patent Number: 5,223,590

[45] Date of Patent: Jun. 29, 1993

[54] MOLECULAR WEIGHT CONTROL IN PEROXIDE-INITIATED AQUEOUS POLYMERIZATIONS

[75] Inventors: Kathleen A. Hughes; Graham Swift, both of Blue Bell, Pa.

[73] Assignee: Rohm and Haas Company, Philadelphia, Pa.

[21] Appl. No.: 763,844

[22] Filed: Sep. 23, 1991

[51] Int. Cl.[5] .............................. C08F 4/40; C08F 2/16
[52] U.S. Cl. ................................... 526/93; 526/303.1; 526/318; 526/319
[58] Field of Search ...................... 526/93, 303.1, 318, 526/319

[56] References Cited

U.S. PATENT DOCUMENTS

| | | |
|---|---|---|
| 4,314,044 | 2/1982 | Hughes et al. |
| 4,659,793 | 4/1987 | Yang . |
| 4,833,222 | 5/1988 | Siddall et al. ........................ 526/202 |
| 4,837,326 | 6/1989 | Lin et al. . |
| 4,886,861 | 12/1989 | Janowicz . |

FOREIGN PATENT DOCUMENTS 3-124711  5/1991  Japan .
3-124712  5/1991  Japan .

OTHER PUBLICATIONS

J. Macrol. Sci.-Chem., A26 (8), pp. 1137-1149 (1989).
J. Polymer Science: Polymer Chemistry Edition, vol. 19, 879-889 (1981).

Primary Examiner—Joseph L. Schofer
Assistant Examiner—DAvid Wu
Attorney, Agent, or Firm—David T. Banchik; Brian W. Stegman

[57] ABSTRACT

This invention relates to the use of copper and cobalt ions to control molecular weight in the aqueous polymerization of vinyl monomers. Incorporating catalytic amounts, generally from 1 to about 300 ppm of copper or cobalt ions, in aqueous polymerization reactions initiated with peroxides, preferably with partial neutralization of the monomers, provides for molecular weight control of the resulting polymers.

22 Claims, No Drawings

MOLECULAR WEIGHT CONTROL IN PEROXIDE-INITIATED AQUEOUS POLYMERIZATIONS

FIELD OF THE INVENTION

This invention relates to a method of controlling the molecular weight of polymers produced by aqueous polymerization. In particular, this invention relates to the use of copper II ions and cobalt II ions in aqueous polymerization processes using peroxide initiators as a means for controlling the molecular weight of the resulting polymers. Catalytic amounts of copper and cobalt provide efficient use of the peroxide initiators and are effective chain terminators, thereby providing control of the molecular weight of the resulting polymers.

BACKGROUND OF THE INVENTION

Low molecular weight polymers are known to be useful as dispersants, scale-inhibitors, detergent additives, chelating agents and the like. A difficulty encountered in the production of low molecular weight polymers by free-radical polymerization is effective control over the degree of polymerization and the resulting molecular weight of the polymers. Various attempts at achieving an acceptable level of control have met with some success, but they all have significant drawbacks. These attempts include the use of chain transfer agents, increasing the level of initiator and using large amounts of metal salts as polymerization moderators.

The use of chain transfer agents has several drawbacks. This approach will impart the functionality of the chain transfer agent into the polymer chain. This can be undesirable since functionality has an increasing effect on the properties of the polymer as molecular weight decreases. Furthermore, the chain transfer agents commonly employed are mercaptans. These materials are expensive and have objectionable odors associated with them. Other common chain transfer agents are hypophosphites and alcohols. These also add to the cost of the process, impart functionality to the polymer, and may necessitate a product separation step.

Attempting to control molecular weight by increasing the amount of initiator is also problematic. This approach adds considerably to the cost of production and may result in polymer chain degradation, crosslinking, and high levels of unreacted initiator remaining in the product. The same is true for chain stopping agents such as sodium metabisulfite. Among the preferred free-radical initiators for aqueous polymerization is hydrogen peroxide. It is relatively inexpensive, it has low toxicity, and does not produce detrimental salt by-products. However, hydrogen peroxide does not decompose efficiently at conventional polymerization temperatures, and large amounts must be used to generate enough radicals to carry out a polymerization.

High levels of metal ions have also been tried as a means for controlling molecular weight. This approach also suffers from increased cost and has associated with it serious health and environmental concerns. In addition, the product is usually discolored by the metal ions.

U.S. Pat. No. 4,314,044 (Hughes et al.) teaches the use of high levels of various metal salts, including copper and cobalt salts, as part of a catalyst system as a means of controlling the molecular weight of water-soluble polymers. This patent requires a molar ratio of initiator to metal salt activator of from 10:1 to 150:1 wherein the initiator is present from 0.5 to 35 percent by weight based on the weight of monomers present. In particular, the metal ions are taught to activate the initiator.

U.S. Pat. No. 4,659,793 (Yang) teaches enhanced incorporation of monoethylenically unsaturated dicarboxylic acids when said dicarboxylic acids are copolymerized with a-$\beta$ ethylenically unsaturated monomer by using any of several metal salts, including copper and cobalt, and conducting the polymerization at a pH of from 2 to 4 when the level of dicarboxylic acid is from 20 to 25 percent by weight of the monomer mixture, and at a pH of from 4 to 6 when the level of dicarboxylic acid is from 40 to 50 percent by weight of the monomer mixture. The process used by Yang is a heel process wherein the dicarboxylic acid is charged to the kettle prior to the metered addition of the other monomers. Yang only shows the effects of using iron as a molecular weight control agent.

Many boron complexes are known as catalysts and chain terminators in acrylic free-radical polymerizations. However, these boron complexes are generally not water-stable and, thus, are not of use in an aqueous polymerization system. In an article appearing in J. Macromol. Sci.-Chem., A26(8), pp. 1127–1149 (1989), Sanayei et al. discloses the use of cobaloxime boron fluoride as a chain transfer agent in the free-radical polymerization of methyl methacrylate. U.S. Pat. No. 4,837,326 (Lin, et al.) describes cobalt(II) nitrilomethylidyne dipyrrole complexes for use as chain transfer agents in acrylic polymerizations done in methyl ethyl ketone as the reaction solvent. In J. Poly. Sci. Polym. Chem. Ed., 19, 879 (1981), Enikolopyan et al. discloses the use of cobalt(II) porphyrin complexes as chain transfer agents for the free-radical copolymerization of methacrylic acid and styrene. U.S. Pat. No. 4,886,861 (Janowicz) describes various cobalt complexes for use as chain transfer agents for acrylic and styrenic polymerizations carried out in an organic solvent.

SUMMARY OF THE INVENTION

It is an object of this invention to provide a method of producing water-soluble polymers having weight average molecular weight of from 500 to 50,000 by incorporating one or more water-soluble salts of a metal ion selected from the group consisting of copper and cobalt into an aqueous polymerization mixture at a level of from 1 to about 300 parts per million (ppm), wherein the aqueous polymerization mixture contains water, one or more peroxide initiators, and one or more water-soluble polymerizable monomers; and reacting the mixture at an elevated temperature to produce a polymer product. The level of metal as reported in the specification and claims is the level of the metal ion, as opposed to the metal salt, in ppm based on the total amount of polymerizable monomer. It is a further object of this invention to provide a method of efficiently utilizing peroxide initiators. Another object of this invention is to provide an efficient process for preparing low molecular weight polymers. Other objects of this invention will be apparent from the following detailed description and the appended claims.

DETAILED DESCRIPTION OF THE INVENTION

We have found that by incorporating into a polymerization from about 1 to about 300 ppm of copper II ion or cobalt II ion, we can control the molecular weight of the resulting polymer formed.

Monomers suitable for this invention are those which have sufficient water-solubility to be polymerizable as an aqueous solution. Preferred monomers include acrylic acid, methacrylic acid, $C_1$-$C_4$ alkyl esters of acrylic acid or methacrylic acid, $C_1$-$C_4$ hydroxyalkyl esters of acrylic or methacrylic acids, maleic acid and itaconic acid. Other suitable monomers include crotonic acid, fumaric acid, vinyl acetic acid, acryloxypropionic acid, acrylamide, methacrylamide, N-tertiary-butylacrylamide, N-methylacrylamide, N,N-dimethylacrylamide; acrylonitrile, methacrylonitrile, allyl alcohol, allyl sulfonic acid, allyl phosphonic acid, vinylphosphonic acid, dimethylaminoethyl acrylate, dimethylaminoethyl methacrylate, phosphoethyl methacrylate, N-vinyl pyrollidone, N-vinylformamide, N-vinylimidazole, ethylene glycol diacrylate, trimethylolpropane triacrylate, diallyl phthalate, vinyl acetate, styrene, vinylsulfonic acid, and 2-acrylamido-2-methylpropanesulfonic acid (AMPS). The polymers produced by the process of the present invention can also be copolymers and terpolymers. Copolymers and terpolymers can be made by incorporating two or more of the monomers listed above, or any other comonomer which has sufficient water-solubility and is copolymerizable with the monomer(s). Most preferably, the monomer is acrylic acid, methacrylic acid, maleic acid or combinations thereof.

Copolymers and terpolymers may contain from 1 to 50 percent by weight of a second monomer, comonomer, or combination thereof. Preferably, the copolymers and terpolymers will contain from about 5 to about 35 percent by weight, and most preferably from about 10 to about 25 percent by weight of a second monomer, comonomer, or combination thereof. As used hereinafter and in the appended claims, "polymer" may refer to homopolymers, copolymers or terpolymers, unless a clearly different meaning is indicated.

In a preferred embodiment of the present invention, acid monomers are used in an at least partially neutralized form. The neutralization can be accomplished with any suitable base. Suitable bases include, but are not limited to, the alkali metal hydroxides, ammonia, and the like. Preferably, the base is sodium hydroxide or potassium hydroxide. When the acid monomers are neutralized, they should be neutralized at from about 5 to 100 percent, preferably from about 20 to about 80 percent, and most preferably from about 40 to about 75 percent. In one embodiment, the monomers are subjected to inprocess neutralization (IPN). IPN requires the gradual addition of the neutralizer during the polymerization. IPN avoids having to preneutralize the monomers which, on a plant-scale, can be costly since the heat of neutralization must be removed. Another advantage of IPN is that it can utilize the heat of neutralization to maintain the desired reaction temperature.

The metal ion salts which provide for effective control of molecular weight are copper II and cobalt II ions. These ions are formed in aqueous solutions when salts of the metals are dissolved in water. Typical salts which will form the ions are sulfate, chloride and nitrate. In order to achieve control of the molecular weight, the metal ions must be present in the polymerization mixture at levels of from about 1 to about 300 ppm based on the total polymerizable monomers. The exact level of metal ion will depend on the desired molecular weight of the product, the type of monomers being used and the type of metal ion present. Preferably, the metal ions will be present in the polymerization mixture at a level of from about 5 to about 150 ppm, and most preferably from about 10 to about 100 ppm based on the total polymerizable monomers.

Initiators suitable for use in the present invention are peroxides. Particularly suitable are $C_1$-$C_{12}$ alkyl and aryl hydroperoxides and hydrogen peroxide. Preferred initiators are hydrogen peroxide, tertiary butyl hydroperoxide, di-tertiary-butyl hydroperoxide and lauroyl peroxide. Most preferably, the initiator is hydrogen peroxide. While the level of initiator is not critical for the present invention, it will generally be used at a level of from about 0.5 percent to about 25 percent by weight of the total polymerizable monomers. Preferably, the level of initiator will be from about 1 to about 20 percent and most preferably from about 2 to 10 percent by weight of the total polymerizable monomers.

As a result of the present invention, the relative amounts of initiator to metal ion can be very large while maintaining control of the molecular weight and efficiently utilizing the initiator. The molar ratio of initiator to metal ion is in the range of from 300:1 to 200,000:1, preferably from about 300:1 to about 100,000:1 and most preferably from about 350:1 to about 50,000:1.

Although the exact mechanism of the present invention is not fully understood, it is believed that the metal ions serve two functions in aqueous polymerization systems initiated with peroxides when present at levels of from 1 to about 300 ppm based on the total polymerizable monomers. First, the metal ions may catalytically decompose the peroxide to form radicals as follows:

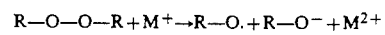
$$R-O-O-R + M^+ \rightarrow R-O. + R-O^- + M^{2+}$$

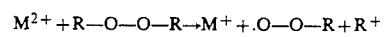
$$M^{2+} + R-O-O-R \rightarrow M^+ + .O-O-R + R^+$$

where R is hydrogen, $C_1$-$C_{12}$ alkyl or $C_1$-$C_{12}$ aryl and M is copper or cobalt. Second, the metal ions may act as a chain transfer agent as follows:

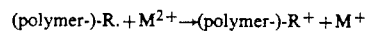
$$(\text{polymer-})\text{-R.} + M^{2+} \rightarrow (\text{polymer-})\text{-R}^+ + M^+$$

where R. is a carbon radical of a monomer and M is copper or cobalt. This is believed to be a mechanism which accounts for the results observed, but it is not intended in any way to limit the scope of the invention.

This proposed mechanism may account for the importance of the acid monomers being polymerized in a partially or completely neutralized form. If the polymerization reaction becomes highly acidic, the metal ions may favor the first or zero oxidation state and will not participate in the mechanism described above. If the first oxidation state is strongly favored, the alternative pathway toward peroxide cleavage will not be seen, nor will the chain transfer effects of the metal in the second oxidation state. If the zero oxidation state is favored, the metal ions may precipitate from the reaction.

The presence of the copper II or cobalt II ions, particularly with controlled pH, provides for control of the molecular weight of the resulting polymer, copolymer or terpolymer in any conventional polymerization process. The polymerization can be run as a batch, cofeed, staggered cofeed, heel, semi-continuous or continuous process. Preferably, the process is a batch or continuous process.

Temperature is not critical for the present invention, although the temperature of the polymerization does affect the molecular weight of the resulting polymer product. However, the presence of the copper II or cobalt II ions at a controlled pH still provides improved control of the molecular weight of the product. The polymerization temperature is usually dependent on the type of initiator used but is usually from about 60° to about 180° C., and preferably from about 80° to about 150° C.

The molecular weight of the polymers can be controlled even when producing polymers having weight average molecular weights as low as a few hundred. The molecular weights discussed below in the tables and appended claims are molecular weights as determined by gel permeation chromatography (GPC) using polyacrylic acid as a reference standard. Preferably, the weight average molecular weight of the resulting polymers is from 500 to 50,000, more preferably from 750 to 10,000, and most preferably from 1,000 to 5,000.

The following examples are intended to illustrate various embodiments of the present invention but shall not be construed to limit the invention thereby.

EXAMPLE 1

Polyacrylic acid: 25 ppm Cu: Ambient pH: 100° C.

250.0 grams of deionized water and 16.0 grams of 0.15 percent $CuSO_4.5H_2O$ in deionized water were added to a 1 liter round bottom flask equipped with a stirrer, thermometer, condenser, heater, and inlets for monomer, and initiator solutions. The stirrer was turned on and the water was heated to reflux. Two feed solutions were prepared: a monomer solution of 250.0 grams glacial acrylic acid and an initiator solution of 83.3 grams of 30% by weight hydrogen peroxide. These solutions were fed into the refluxing reactor linearly and separately over two hours while maintaining the mixture at reflux. After the feeds were completed, the mixture was cooled to below 70° C. and sampled.

EXAMPLE 2

Polyacrylic acid: 25 ppm Cu: Ambient pH: 140° C.

Same procedure as Example 1 was followed except that 16.6 grams of 30% by weight hydrogen peroxide was used and the polymerization was conducted in an autoclave at 140° C. under pressure.

EXAMPLE 3

Polyacrylic acid: 25 ppm Cu: Ambient pH: 160° C.

Same procedure as Example 2 was followed except that the polymerization was conducted at 160° C. under pressure.

EXAMPLE 4

Polyacrylic acid: 25 ppm Cu: 75 Percent IPN: 100° C.

240.0 grams of deionized water and 16.0 grams of 0.15 percent $CuSO_4.5H_2O$ in deionized water were added to a 1 liter round bottom flask equipped with a stirrer, thermometer, condenser, heater, and inlets for monomer, initiator and neutralizer solutions. The stirrer was turned on and the water was heated to reflux. Three feed solutions were prepared: a monomer solution of 250.0 grams glacial acrylic acid, an initiator solution of 16.6 grams of 30% by weight hydrogen peroxide dissolved in 50.0 grams deionized water, and a neutralizer solution 208.0 grams of 50 percent by weight sodium hydroxide in deionized water. The three solutions were fed into the refluxing reactor linearly and separately over two hours while maintaining the mixture at reflux. After the feeds were completed, the mixture was cooled to below 50° C. and 10.0 grams of deionized water was added to the mixture through the neutralizer inlet as a rinse.

EXAMPLE 5

Polyacrylic acid: 25 ppm Cu: 75 Percent IPN: 120° C.

230.0 grams of deionized water and 16.0 grams of 0.15 percent $CuSO_4.5H_2O$ in deionized water were added to a 1 liter autoclave equipped with a stirrer, thermometer, heater and inlets for monomer, initiator and neutralizer solutions. The stirrer was turned on and the water was heated to 120° C. under pressure. Three feed solutions were prepared: a monomer solution of 250.0 grams glacial acrylic acid, an initiator solution of 16.6 grams of 30% by weight hydrogen peroxide dissolved in 40.0 grams deionized water, and a neutralizer solution of 208.0 grams of 50 percent by weight sodium hydroxide in deionized water. The three solutions were fed into the refluxing reactor linearly and separately over two hours while maintaining the mixture at 120° C. After the feeds were completed, 10.0 ml of deionized water was fed through each of the inlets as a rinse. The mixture was then cooled to below 50° C.

EXAMPLE 6

Polyacrylic acid: 25 ppm Cu: 75 Percent IPN: 140° C.

Same procedure as Example 5 was followed except that the polymerization was conducted at 140° C.

EXAMPLE 7

Polymethacrylic acid: 25 ppm Cu: 75 Percent IPN: 100° C.

The same procedure as Example 4 was followed except the monomer feed was 250 grams of methacrylic acid and the neutralizer feed solution was 174.0 grams of 50 percent by weight sodium hydroxide in deionized water. After cooling, the reaction mixture was postneutralized with a solution of 42.01 grams of 50 percent by weight sodium hydroxide in deionized water. Then 10.0 grams of deionized water was added to the mixture through the neutralizer inlet as a rinse.

EXAMPLE 8

Polymethacrylic acid: 25 ppm Cu: 75 percent IPN: 120° C.

Same procedure as Example 7 was followed except that the polymerization was conducted in an autoclave at 120° C. under pressure.

EXAMPLE 9

Polyacrylic acid: 25 ppm Cu: 75 percent IPN: 140° C.

Same procedure as Example 7 was followed except that the polymerization was conducted in an autoclave at 140° C. under pressure.

EXAMPLE 30

Poly(acrylic acid/maleic acid): 10 ppm Cu: 50 Percent IPN 240.0 grams of deionized water and 6.0 grams of 0.15 percent $CuSO_4.5H_2O$ in deionized water were added to a 1 liter round bottom flask equipped with a stirrer, thermometer, condenser, heater and inlets for monomer, initiator and neutralizer solutions. The stirrer was turned on and the water was heated to reflux. Three feed solutions were prepared: a monomer solution of 200.0 grams glacial acrylic acid and 42.4 grams of maleic anhydride, an initiator solution of 31.2 grams of 30% by weight hydrogen peroxide, and a neutralizer solution 145.4 grams of 50 percent by weight sodium hydroxide in deionized water. The three solutions were fed into the refluxing reactor linearly and separately over two hours while maintaining the mixture at reflux. After the feeds were completed, 10.0 ml of deionized water was fed through neutralizer inlet as a rinse. The mixture was then cooled to below 60° C. After cooling, the reaction mixture was post-neutralized with a solution of 98.8 grams of 50 percent by weight sodium hydroxide in deionized water.

EXAMPLE 31

Poly(acrylic acid/maleic acid): 10 ppm Cu: 75 Percent IPN

The procedure of Example 30 was repeated except that the neutralizer solution was 217.0 grams of 50 percent by weight sodium hydroxide and the post-neutralization solution was 27.3 grams of 50 percent by weight sodium hydroxide.

EXAMPLE 32

Poly(acrylic acid/maleic acid): 15 ppm Cu: 75 Percent IPN

The procedure of Example 31 was repeated except that 9.0 grams of 0.15 percent $CuSO_4.5H_2O$ in deionized water was initially added to the flask.

EXAMPLE 33

Poly(acrylic acid/maleic acid): 6 ppm Cu: 75 Percent IPN 240.0 grams of deionized water and 4.0 grams of 0.15 percent $CuSO_4.5H_2O$ in deionized water were added to a 1 liter round bottom flask equipped with a stirrer, thermometer, condenser, heater and inlets for monomer, initiator and neutralizer solutions. The stirrer was turned on and the water was heated to reflux. Three feed solutions were prepared: a monomer solution of 187.5 grams glacial acrylic acid and 52.8 grams of maleic anhydride, an initiator solution of 12.5 grams of 30% by weight hydrogen peroxide, and a neutralizer solution 218.1 grams of 50 percent by weight sodium hydroxide in deionized water. The three solutions were fed into the refluxing reactor linearly and separately over two hours while maintaining the mixture at reflux. After the feeds were completed, 10.0 ml of deionized water was fed through neutralizer inlet as a rinse. The mixture was then cooled to below 60° C. After cooling, the reaction mixture was post-neutralized with a solution of 47.64 grams of 50 percent by weight sodium hydroxide in deionized water.

EXAMPLE 34

Poly(acrylic acid/maleic anhydride): 6 ppm Cu: 50 Percent IPN

The procedure of Example 33 was repeated except that the monomer solution was 175.0 grams of glacial acrylic acid and 63.0 maleic anhydride, and the neutralizer solution was 145.0 grams of 50 percent by weight sodium hydroxide. The post-neutralization solution was 114.94 grams of 50 percent by weight sodium hydroxide.

COMPARATIVE EXAMPLE 3

Polyacrylic acid: No Metal: 25 Percent IPN 230.0 grams of deionized water was added to a 1 liter round bottom flask equipped with a stirrer, thermometer, condenser, heater and inlets for monomer, initiator and neutralizer solutions. The stirrer was turned on and the water was heated to reflux. Three feed solutions were prepared: a monomer solution of 250.0 grams glacial acrylic acid, an initiator solution of 83.3 grams of 30% by weight hydrogen peroxide, and a neutralizer solution 69.5 grams of 50 percent by weight sodium hydroxide in deionized water. The three solutions were fed into the refluxing reactor linearly and separately over two hours while maintaining the mixture at reflux. After the feeds were completed, the mixture was cooled to below 50° C. and post-neutralized with 173.22 grams of 50 percent by weight sodium hydroxide in deionized water.

COMPARATIVE EXAMPLE 5

Polyacrylic acid: No Metal: 50 Percent IPN: EDTA

The same procedure as Comparative Example 3 was followed except that 0.5 grams of ethylene diamine tetraacetic acid (EDTA) was added to the initial charge of deionized water. EDTA is a known metal chelant which was added to remove any trace metal ions which may have been present in the reaction mixture. Also, the neutralizer feed solution was 139.0 grams of 50 percent by weight sodium hydroxide in deionized water and the post-neutralizer solution was 109.07 grams of sodium hydroxide in deionized water. 100.0 grams of deionized water was added to dilute the polymer solution.

COMPARATIVE EXAMPLE 7

Polyacrylic acid: No Metal: 75 Percent IPN

The same procedure as Comparative Example 3 was followed except the neutralizer feed solution was 208.5 grams of 50 percent by weight sodium hydroxide in deionized water and the post-neutralizer solution was 48.15 grams of sodium hydroxide in deionized water.

COMPARATIVE EXAMPLE 9

Polyacrylic acid: No Metal: 100 Percent IPN

The same procedure as Comparative Example 3 was followed except the neutralizer feed solution was 278.0 grams of 50 percent by weight sodium hydroxide in deionized water and no post-neutralizer solution was added. 100.0 grams of deionized water was added to dilute the polymer solution.

In the following tables $M_w$ is the weight average molecular weight and $M_n$ is the number average molecular weight as measured by gel permeation chromatography using poly(acrylic acid) as a standard. Residuals are based on the initial amounts used. The levels of metal are expressed in ppm based on the total amount of polymerizable monomer.

The data appearing in Table I below show the results of 25 ppm copper on the molecular weight of polyacrylic acid (pAA) and polymethacrylic acid (pMAA) as a function of temperature and in-process pH. All of the examples appearing in Table I were prepared with $H_2O_2$ at a level of 2 percent by weight of the monomers, except Example 1 which was prepared with $H_2O_2$ at a level of 10 percent by weight of the monomers.

TABLE I

| EXAMPLE | TEMP (°C.) | $M_w$ | $M_n$ | RESIDUAL AA |
|---|---|---|---|---|
| | pAA @ AMBIENT pH | | | |
| 1 | 100 | 44800 | 8530 | 1.1% |
| 2 | 140 | 9100 | 4370 | 5.2% |
| 3 | 160 | 6400 | 4090 | 2.5% |
| | pAA @ 75% NEUTRALIZATION | | | |
| 4 | 100 | 20500 | 8790 | 0.6% |
| 5 | 120 | 10500 | 5830 | 1.4% |
| 6 | 140 | 4900 | 3480 | 12.7% |
| | pMAA @ 75% NEUTRALIZATION | | | |
| 7 | 100 | 10600 | 3750 | 3.4% |
| 8 | 120 | 9790 | 4670 | 4.8% |
| 9 | 140 | 6410 | 3030 | 13.7% |

The data appearing in Table II below show how the molecular weight of the polymer produced can be controlled by the presence of a small amount of copper or cobalt ion and contrasts this with polymers produced in the absence of metal ions and those produced in the presence of other metal ions. The data illustrate the effect that copper and cobalt have on the efficiency of the degradation of the hydrogen peroxide in both poly(acrylic acid) and poly(methacrylic acid) systems, particularly when the monomers are at least partially neutralized during the polymerization.

TABLE II

| EXAMPLE | POLYMER | METAL/AMOUNT | $M_w$ | $M_n$ | RES. $H_2O_2$ |
|---|---|---|---|---|---|
| | | AT 0% IPN | | | |
| Comp. 1 | pAA | —/0 | 267000 | 36000 | 98% |
| Comp. 2 | pAA | Fe/25 ppm | 92600 | 5710 | 82% |
| 10 | pAA | Co/25 ppm | 45000 | 7890 | 84% |
| 1 | pAA | Cu/25 ppm | 44800 | 8530 | 92% |
| 12 | pMAA | Cu/25 ppm | 22300 | 15600 | 70% |
| | | AT 25% IPN | | | |
| Comp. 3 | pAA | —/0 | 118000 | 22800 | 85% |
| 13 | pAA | Cu/25 ppm | 8980 | 4940 | 56% |
| 14 | pMAA | Cu/25 ppm | 3020 | 2130 | 40% |
| | | AT 50% IPN | | | |
| Comp. 4 | pAA | —/0 | 75300 | 12700 | 74% |
| Comp. 5 | pAA | —/0 | 72400 | 19550 | 41% |
| Comp. 6 | pAA | Fe/25 ppm | 18800 | 8210 | 66% |
| 15 | pAA | Co/25 ppm | 8670 | 4300 | 27% |
| 16 | pAA | Cu/25 ppm | 6320 | 3750 | 32% |
| 17 | pMAA | Cu/25 ppm | 2720 | 1650 | 27% |
| | | AT 75% IPN | | | |
| Comp. 7 | pAA | —/0 | 49900 | 14900 | 54% |
| Comp. 8 | pAA | Fe/25 ppm | 15900 | 5220 | 42% |
| 18 | pAA | Cu/25 ppm | 4830 | 3000 | 13% |
| 19 | pMAA | Cu/25 ppm | 1830 | 1070 | 0% |
| | | AT 100% IPN | | | |
| Comp. 9 | pAA | —/0 | 115000 | 33500 | 0% |
| Comp. 10 | pAA | Fe/25 ppm | 129000 | 56900 | 0% |
| 20 | pAA | Cu/25 ppm | 10300 | 5470 | 0% |
| 21 | pMAA | Cu/25 ppm | 5920 | 2610 | 0% |

The data appearing in Table III below show the effect of the level of copper ion on the molecular weight of polyacrylic acid and polymethacrylic acid. The data also show the efficiency of the copper ion at promoting the degradation of the initiator and the effect of IPN. Residual hydrogen peroxide levels are below 15 percent in: (a) the 50 percent IPN acrylic acid polymerizations using copper ion levels of 50 ppm; (b) the 75 percent IPN acrylic acid polymerization using copper ion levels of 25 ppm; and (c) the methacrylic acid systems using copper ion levels of 12.5 ppm.

TABLE III

| EXAMPLE | POLYMER | METAL/AMOUNT | $M_w$ | $M_n$ | RES. $H_2O_2$ |
|---|---|---|---|---|---|
| | | AT 50% IPN AND 10% $H_2O_2$ | | | |
| Comp. 4 | pAA | —/0 | 75300 | 12700 | 74% |
| 22 | pAA | Cu/12.5 ppm | 7310 | 3750 | 45% |
| 16 | pAA | Cu/25 ppm | 6320 | 3750 | 32% |
| 23 | pAA | Cu/50 ppm | 4180 | 2610 | 14% |
| | | AT 75% IPN AND 10% $H_2O_2$ | | | |
| Comp. 7 | pAA | —/0 | 49900 | 14900 | 54% |
| 18 | pAA | Cu/25 ppm | 4830 | 3000 | 13% |
| 24 | pAA | Cu/50 ppm | 2930 | 1900 | 0% |
| 25 | pAA | Cu/100 ppm | 2510 | 1690 | 0% |
| 26 | pMAA | Cu/12.5 ppm | 2090 | 747 | 0% |
| 19 | pMAA | Cu/25 ppm | 1830 | 1070 | 0% |
| | | AT 75% IPN AND 5% $H_2O_2$ | | | |
| 27 | pMAA | Cu/12.5 ppm | 6040 | 2170 | 11% |
| 28 | pMAA | Cu/25 ppm | 2940 | 1230 | 8% |
| 29 | pMAA | Cu/50 ppm | 1880 | 776 | 0% |

The data in Table IV show similar effects in copolymer systems. Copper ion promotes the degradation of the hydrogen peroxide and gives control of over the molecular weight of the resulting polymer.

TABLE IV

| EXAMPLE | AMOUNT Cu | % IPN | $M_w$ | $M_n$ | $H_2O_2$ | RESIDUAL AA | MALAC |
|---|---|---|---|---|---|---|---|
| Acrylic acid/Maleic acid Copolymers | | | | | | | |
| 30 | 18 ppm | 52 | 16000 | 5380 | 14.3 | 0.12 | 1.02 |
| 31 | 18 ppm | 77 | 21200 | 5560 | 2.51 | 0.60 | 1.61 |
| 32 | 27 ppm | 77 | 9570 | 4170 | 4.85 | 0.95 | 1.06 |
| Acrylic acid/Maleic anhydride Copolymers | | | | | | | |
| 33 | 12 ppm | 74 | 63300 | 7580 | 9.9 | 0.20 | 2.0 |
| 34 | 12 ppm | 59 | 58900 | 5640 | 13.0 | 0.28 | 2.4 |

We claim:

1. A method of producing water-soluble polymers having weight average molecular weight of from 500 to 50,000 comprising: incorporating one or more water-soluble salts of a metal ion selected from the group consisting of copper and cobalt into an aqueous polymerization mixture at a level of from 1 to about 300 ppm, wherein the aqueous polymerization mixture contains water, one or more peroxide initiators such that the molar ratio of initiator to metal ion is in the range of from 300:1 to 200,000:1 and one or more water-soluble polymerizable monomers and reacting the mixture at an elevated temperature to produce a polymer product.

2. The method of claim 1 wherein at least one of the monomers is selected from the group consisting of acrylic acid, methacrylic acid, $C_1$-$C_4$ alkyl esters of acrylic acid, and $C_1$-$C_4$ alkyl esters of methacrylic acid.

3. The method of claim 1 wherein at least one of the monomers is acrylic acid.

4. The method of claim 1 wherein at least one of the monomers is methacrylic acid.

5. The method of claim 1 wherein the water-soluble salt of the metal ion is the metal chloride.

6. The method of claim 1 wherein the water-soluble salt of the metal ion is the metal sulfate.

7. The method of claim 1 wherein the polymer product has a weight average molecular weight of from about 750 to 10,000.

8. The method of claim 1 wherein the polymer product has a weight average molecular weight of from about 1000 to 5,000.

9. The method of claim 1 wherein the initiator is selected from the group consisting of $C_1$-$C_{12}$ alkyl-peroxides, $C_1$-$C_{12}$ aryl-peroxides, and hydrogen peroxide.

10. The method of claim 1 wherein the initiator is hydrogen peroxide.

11. The method of claim 1 wherein the metal salt is incorporated into the polymer mixture at a level of from about 5 to about 150 ppm based on the total polymerizable monomers.

12. The method of claim 1 wherein the metal salt is incorporated into the polymer mixture at a level of from about 10 to about 100 ppm based on the total polymerizable monomers.

13. The method of claim 1 wherein the monomers are neutralized with a suitable base at a level of from about 5 to about 100 percent.

14. The method of claim 1 further wherein the monomers are neutralized with a suitable base at a level of from about 20 to about 80 percent.

15. The method of claim 1 further wherein the monomers are neutralized with a base at a level of from about 40 to about 75 percent.

16. The method of claim 15 wherein the base is an alkali metal hydroxide.

17. The method of claim 15 wherein the base is sodium hydroxide.

18. The method of claim 1 wherein the temperature is from about 90° C. to about 160° C.

19. The method of claim 1 wherein the salts of the metal ion are added to the water in a reactor, the contents of the reactor are heated to the elevated temperature and the one or more water-soluble polymerizable monomers are gradually charged to the reactor.

20. The method of claim 19 wherein the monomers are charged linearly for from about 15 minutes to about 4 hours.

21. The method of claim 19 wherein the monomers are charged linearly for from about 1 hour to about 4 hours.

22. The method of claim 19 further comprising in-process neutralization of the one or more water-soluble polymerizable monomers.

* * * * *